(12) United States Patent
Benosman et al.

(10) Patent No.: US 10,619,879 B2
(45) Date of Patent: Apr. 14, 2020

(54) SYSTEM AND METHOD FOR CONTROLLING OPERATIONS OF AIR-CONDITIONING SYSTEM

(71) Applicant: Mitsubishi Electric Research Laboratories, Inc., Cambridge, MA (US)

(72) Inventors: Mouhacine Benosman, Boston, MA (US); Jeff Borggaard, Blacksburg, VA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 45 days.

(21) Appl. No.: 15/927,809

(22) Filed: Mar. 21, 2018

(65) Prior Publication Data

US 2019/0293314 A1   Sep. 26, 2019

(51) Int. Cl.
*F24F 11/46* (2018.01)
*F24F 11/54* (2018.01)
(Continued)

(52) U.S. Cl.
CPC .............. *F24F 11/46* (2018.01); *F24F 11/54* (2018.01); *F24F 11/56* (2018.01); *F24F 11/64* (2018.01);
(Continued)

(58) Field of Classification Search
CPC .. F24F 11/46; F24F 11/65; F24F 11/54; F24F 11/74; G05B 15/02; G05B 2219/2614; G05B 19/042
(Continued)

(56) References Cited

U.S. PATENT DOCUMENTS 6,219,590 B1 * 4/2001 Bernaden, III .......... G05B 9/02
700/277
8,290,629 B1   10/2012 Mateski et al.
(Continued)

OTHER PUBLICATIONS

Benosman et al., "Learning Based Robust Stabilization for Reduced Order Models of 2D and 3D Boussinesq Equations," Applied Mathematical Modelling, Guilldford, GB. vol. 49, May 8, 2017. pp. 162-181.

*Primary Examiner* — Chun Cao
(74) *Attorney, Agent, or Firm* — Gennadiy Vinokur; James Mcaleenan; Hironori Tsukamoto (57) ABSTRACT

A system for controlling an operation of an air-conditioning system generating airflow in a conditioned environment, includes a set of sensors to produce measurements of the airflow in a set of points in the conditioned environment, a memory to store a model of the airflow dynamics including a combination of a first term transitioning a previous state of the airflow to a current state of the airflow and a second term assisting the transitioning, an observer to estimate the current state of the airflow in the conditioned environment by transitioning the previous state of the airflow forward in time according to the model of airflow dynamics to reduce the observation error in the current state of the airflow, and a controller to control the air-conditioning system based on the current state of the airflow. The first term in the model includes a projection of a physical model of the airflow on a finite-dimensional space. The physical model of the airflow includes physical parameters of the conditioned environment and the projection preserves the physical parameters of the conditioned environment in the first term. The second term includes a function of the range of the bounded uncertainty of the physical parameter, a negative gain, and an observation error between the measurements of the
(Continued)

airflow in the set of points and estimations of the airflow in the set of points according to the model of the airflow.

20 Claims, 10 Drawing Sheets

(51) Int. Cl.
  F24F 11/56      (2018.01)
  F24F 11/64      (2018.01)
  F24F 11/74      (2018.01)
  F24F 11/83      (2018.01)
  F24F 11/86      (2018.01)
  G05B 19/042     (2006.01)
  F24F 11/65      (2018.01)
  G05B 15/02      (2006.01)

(52) U.S. Cl.
  CPC .............. *F24F 11/65* (2018.01); *F24F 11/74* (2018.01); *F24F 11/83* (2018.01); *F24F 11/86* (2018.01); *G05B 15/02* (2013.01); *G05B 19/042* (2013.01); *G05B 2219/2614* (2013.01); *G05B 2219/2638* (2013.01)

(58) Field of Classification Search
  USPC ........................................................ 700/276
  See application file for complete search history.

(56) References Cited

U.S. PATENT DOCUMENTS

| | | | |
|---|---|---|---|
| 9,664,400 | B2 | 5/2017 | Wroblewski et al. |
| 9,982,903 | B1* | 5/2018 | Ridder .................... F24F 11/30 |
| 10,288,306 | B2* | 5/2019 | Ridder .................... F24F 11/30 |
| 2012/0330465 | A1 | 12/2012 | O'Neill et al. |
| 2013/0261808 | A1 | 10/2013 | Besore et al. |
| 2015/0095000 | A1 | 4/2015 | Patil et al. |
| 2016/0109146 | A1 | 4/2016 | Zhang et al. |
| 2016/0258644 | A1 | 8/2016 | Benosman et al. |
| 2016/0258645 | A1* | 9/2016 | Boufounos ............ G05B 17/02 |
| 2016/0281723 | A1* | 9/2016 | Zhang ....................... H02P 6/28 |

* cited by examiner

SYSTEM AND METHOD FOR CONTROLLING OPERATIONS OF AIR-CONDITIONING SYSTEM

TECHNICAL FIELD

This invention relates generally to air-conditioning systems, and more particularly to controlling operations of the air-conditioning system.

BACKGROUND

Air-conditioning systems, such as heating, ventilating and air conditioning (HVAC) system, are widely used in industrial and residential applications. For example, the air-conditioning system can include one or a combination of variable speed compressors, variable position valves, and variable speed fans to the vapor compression cycle to deliver particular amount of heat. The command inputs to the vapor compression system that delivers that particular amount of heat are often not unique and the various combinations of components consume different amounts of energy. Therefore, it is desirable to operate the vapor compression system using the combination of inputs that minimizes energy and thereby maximizes efficiency.

Conventionally, methods maximizing the energy efficiency rely on the use of mathematical models of the physics of air-conditioning systems. Those model-based methods attempt to describe the influence of commanded inputs of the components of the vapor compression system on the thermodynamic behavior of the system and the consumed energy. In those methods, models are used to predict the combination of inputs that meets the heat load requirements and minimizes energy.

The operation of a HVAC system changes an airflow in the conditioned environment defining movement of air from one area of the conditioned environment to another. However, the physical model of the airflow is of infinite dimension and is too complex to be used in real time control applications. In addition, the model of the airflow can also change during the operation of the air-conditioning system, see, e.g., U.S. Patent document U.S. 2016/0258644.

To that end, there is a need for a system and a method for controlling air-conditioning system using real time knowledge of the airflow produced during the operation of the system.

SUMMARY

It is an object of some embodiments to provide a system and a method for controlling an operation of an air-conditioning system such that heat load requirements of the operation are met and a performance of the system is improved. It is a further object of one embodiment to provide such a system and a method that use a model of the airflow in controlling the air-conditioning system. It is a further object of another embodiment to provide such a system and a method that improves the performance of the air-conditioning system over time during the operation of the air-conditioning system.

Some embodiments are based on acknowledgment that the air-conditioning systems vary over time. A model that accurately describes the operation of a vapor compression system at one point in time may not be accurate at a later time as the system changes, for example, due to slowly leaking refrigerant or the accumulation of corrosion on the heat exchangers. In addition, the models of the air-conditioning system often ignore installation-specific characteristics such as room size, causing the model of the air-conditioning system to deviate from operation of the system.

Some embodiments are based on recognition that the knowledge of the airflow produced during an operation of air-conditioning system can be used to optimize the operation of the system. However, the model of the airflow can also change during the operation of the air-conditioning system. Accordingly, there is a need for a system and a method for controlling air-conditioning system using real time knowledge of the airflow produced during the operation of the system.

Some embodiments address a problem of determining and updating the model of the airflow dynamics, such that the model accurately represent the dynamics of the airflow and is able to adapt to the changes in the conditioned environment. Unfortunately, the physical model of the airflow, i.e., the model that captures physics of airflow dynamics, is of infinite dimension and too complex to be used in real time control applications. Accordingly, some embodiments use the model of low dimension suitable for real time update and control. For example, in some embodiments the model includes a reduced order model having a number of parameters less than a physical model of the airflow according to a Boussinesq equation, wherein the Boussinesq equation is a partial differential equation (PDE), and wherein the reduced order model is an ordinary differential equation (ODE).

To that end, some embodiments address a model reduction problem aiming to reduce a complex physical model of, e.g., an infinite dimension, to a simpler model of a lesser dimension, e.g., a finite dimension. In this context, the model reduction problem means determining all parameters or coefficients of the simpler model such that an error between performance measurements of the system according to the complex model and the system according to the simpler model is minimized. For example, in airflow modeling estimation and control applications, there is a need to transform the PDE models representing the airflow with ODE models that have lesser dimension and complexity. Such reduction can allow a real-time control of the airflow systems, such as air conditioning systems.

Some embodiments are based on a realization that PDE models have two types of parameters, i.e., internal and external parameters. The internal parameters refer to internal gains of the model that have no meaning outside of the model. The external parameters are physical parameters of the world affecting the airflow and exist independently from the model of the airflow dynamics. Examples of such physical parameters include one or combination of a viscosity of the air in the conditioned environment, geometry of the conditioned environment, number and types of objects in the conditioned environment, e.g., heat sources such as people.

Some embodiments are based on recognizing that reduction of the model complexities, e.g., transformation of the PDE model into an ODE model, should preserve the physical parameters of the PDE model in the reduced complexity model. In such a manner, the reduced complexity model can more accurately represent the PDE model. However, the physical parameters of the PDE model are often ambiguous, i.e., include uncertainties. For example, the viscosity of the air can vary and/or different number of people can be present in the conditioned environment at different times. Some embodiments are based on recognizing that the values of the physical parameters are uncertain with a bounded uncertainty, referred herein as a range of the bounded uncertainty.

However, within the range of the bounded uncertainty, the values of the physical parameters are unknown and can vary.

Some embodiments are based on realization that the lack of knowledge about the physical parameters of the model of airflow dynamics can be compensated by forcing an energy function of an observation error in the conditioned environment to decrease for any value of the physical parameters within a range of the bounded uncertainty. To that end, some embodiments use a Lyapunov approach to analyze the energy function and its derivative with respect to time. Some embodiments are based on realization that such an approach allows to absorb the effect of the uncertainties of the physical parameters on estimation of the state of the airflow.

During the analysis of the derivative of the Lyapunov function some embodiments found a term that make the derivative of the Lyapunov function always negative, regardless of the actual value of the uncertainties. This term includes a product of a range of the bounded uncertainty and a negative gain to make the derivative of the Lyapunov function always negative, regardless of the actual value of the uncertainties, which in turn, makes the energy function decreases over time iterations, regardless of the value of the uncertainties, and thus the observation error decreases to zero over the time iterations, for any value of the physical parameters within the range of the bounded uncertainty.

Some embodiments modify the model of airflow dynamic with the term that relates the range of bounded uncertainty of the physical parameter with a derivative of the energy function to assist the convergence of the transition of the state of the airflow from the previous to its current state. To that end, in some embodiments, the model of airflow dynamics includes a first term transitioning the previous state of the airflow to its current state and a second term assisting that transition. Specifically, the first term includes a projection of a physical model of the airflow on a finite-dimensional space—the physical model of the airflow includes physical parameters of the conditioned environment and the projection preserves the physical parameters of the conditioned environment in the first term. The second term includes a function of the range of the bounded uncertainty, a negative gain, and an observation error between the measurements of the airflow in the set of points and estimations of the airflow in the set of points according to the model of the airflow.

In such a manner, the combination of the first and the second terms in the model of the airflow dynamics allow to reduce the complexity of the model while preserving its accuracy. In various embodiments, the state of the airflow is determined iteratively. Because the second term is designed to force the derivative of the energy function of the observation error to be negative definite, the iterative update of the state of the airflow forces reduction of the observation error over multiple control steps.

Definitions

In describing embodiments, the following definitions are applicable throughout (including above).

A "control system" or a "controller" refers to a device or a set of devices to manage, command, direct or regulate the behavior of other devices or systems. The control system can be implemented by either software or hardware, and can include one or several modules. The control system, including feedback loops, can be implemented using a microprocessor. The control system can be an embedded system.

An "air-conditioning system" or a heating, ventilating, and air-conditioning (HVAC) system refers to a system that uses the vapor compression cycle to move refrigerant through components of the system based on principles of thermodynamics, fluid mechanics, and/or heat transfer. The air-conditioning systems span a very broad set of systems, ranging from systems that supply only outdoor air to the occupants of a building, to systems that only control the temperature of a building, to systems that control the temperature and humidity.

"Components of an air-conditioning system" refer to any components of the system having an operation controllable by the control systems. The components include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the air-conditioning system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in the air-conditioning system.

"Set of control signals" or "control inputs" refers to specific values of the inputs for controlling the operation of the components of the vapor compression system. The set of control signals includes, but are not limited to, values of the speed of the compressor, the position of the expansion valve, the speed of the fan in the evaporator, and the speed of the fan in the condenser.

A "set-point" refers to a target value the system, such as the air-conditioning system, aim to reach and maintain as a result of the operation. The term set-point is applied to any particular value of a specific set of control signals and thermodynamic and environmental parameters.

A "central processing unit (CPU)" or a "processor" refers to a computer or a component of a computer that reads and executes software instructions.

A "module" or a "unit" refers to a basic component in a computer that performs a task or part of a task. It can be implemented by either software or hardware.

DETAILED DESCRIPTION

Figure 1A:
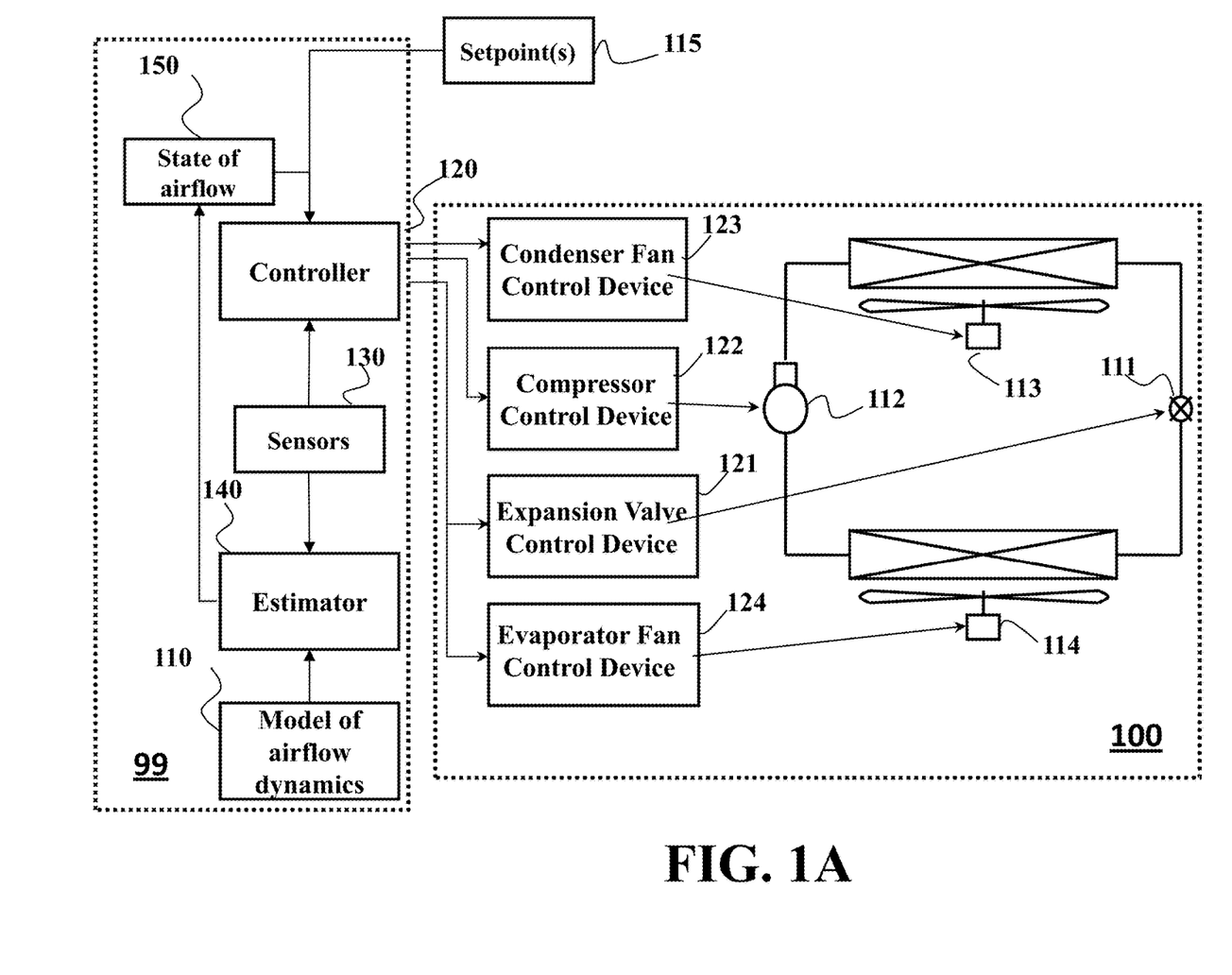
FIG. 1A shows a block diagram of a system 99 for controlling an operation of an air-conditioning system 100 generating airflow in a conditioned environment according to one embodiment.

FIG. 1A shows a block diagram of a system 99 for controlling an operation of an air-conditioning system 100 generating airflow in a conditioned environment according to one embodiment. The air-conditioning system 100 can include one or a combination of components such an evaporator fan 114, a condenser fan 113, an expansion valve 111, and a compressor 112. The system 99 controls the air-conditioning system 100 using a controller 120 responsible for accepting set-points 115, e.g., from a thermostat, and readings of a sensor 130, and outputting a set of control signals for controlling operation of the components. A controller 120 is operatively connected to a set of control devices for transforming the set of control signals into a set of specific control inputs for corresponding components. For example, the controller is connected to a compressor control device 122, to an expansion valve control device 121, to an evaporator fan control device 124, and to a condenser fan control device 123.

The controller is operatively connected to an estimator 140 configured to estimate the current state of the airflow 150. In various embodiments, the controller 120 controls the air-conditioning system 100 using the current state of the airflow 150. Example of the state of the airflow includes one or combination of values of flow and temperature in the room of air conditioned during the operation of the air-conditioning system. In this manner, the controller controls operation of the air-conditioning system such that the set-point values are achieved for a given heat load. For example, the supervisory controller determines and/or updates at least one control input for at least one component of the air-conditioning system to optimize a metric of performance determines using the state of the airflow 150.

To determine the current state of the airflow 150, the estimator 140 uses a model of the airflow dynamics 110. The model 110 allows the estimator 140 to determine the state of the airflow 150 by transitioning the previous state of the airflow forward in time according to the model of airflow dynamics to reduce an observation error in the current state of the airflow. In various implementations, the observation error is an error between the measurements of the airflow in the set of points and the corresponding estimations of the airflow in the set of points according to the model of the airflow. In such a manner, the observation error is a partial observation error allowing to reduce a number of sensors measuring the state of the airflow in the conditioned environment.

Figure 1B:
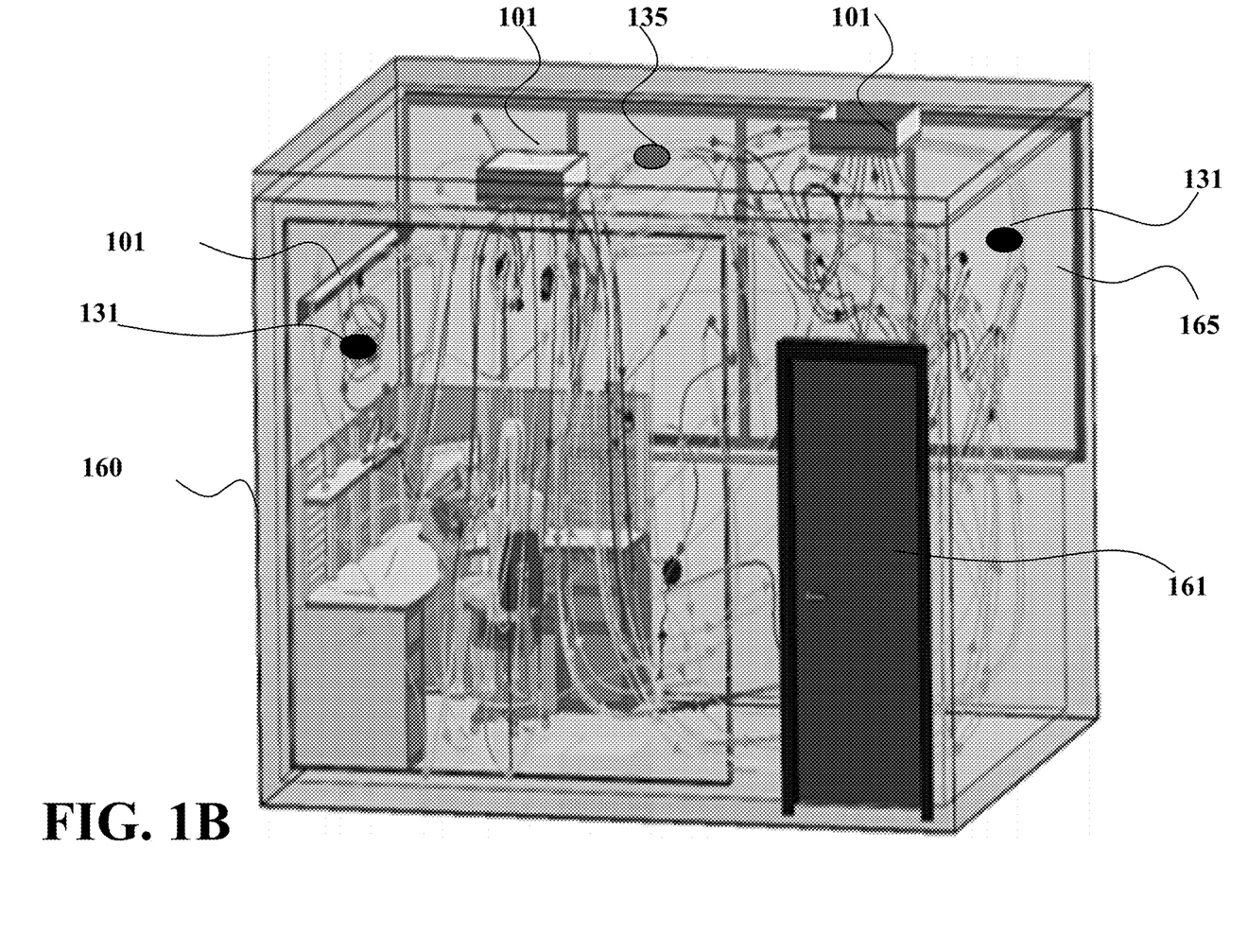
FIG. 1B shows a schematic of an example of air-conditioning a room 160 conditioned according to some embodiments.

FIG. 1B shows a schematic of an example of air-conditioning a room 160 conditioned according to some embodiments. In this example, the room 160 has a door 161 and at least one window 165. The temperature and airflow of the room is controlled by the air-conditioning system, such as the system 100 through ventilation units 101. A set of sensors 130 is arranged in the room, such as at least one airflow sensor 131 for measuring velocity of the airflow at a given point in the room, and at least one temperature sensor 135 for measuring the room temperature. Other type of setting can be considered, for example a room with multiple HVAC units, or a house with multiple rooms.

The controller 120 can be implemented in hardware or as a software program executed in a processor, e.g., a microprocessor, which at fixed or variable control period sampling intervals receives the measurements from the sensors 130, the desired set points 115, the state of the airflow 150 and determines, using this information, the inputs, e.g., the control signal, for operating the air-conditioning system 100.

The estimator 140 can be implemented in hardware or as a software program executed in a processor, either the same or a different processor from the controller 120, which at fixed or variable control period sampling intervals receives the measurements from the sensors 130 and determines, using the new and the previous measurements and the previous state of the airflow, the current state 150 of the airflow.

Figure 1C:
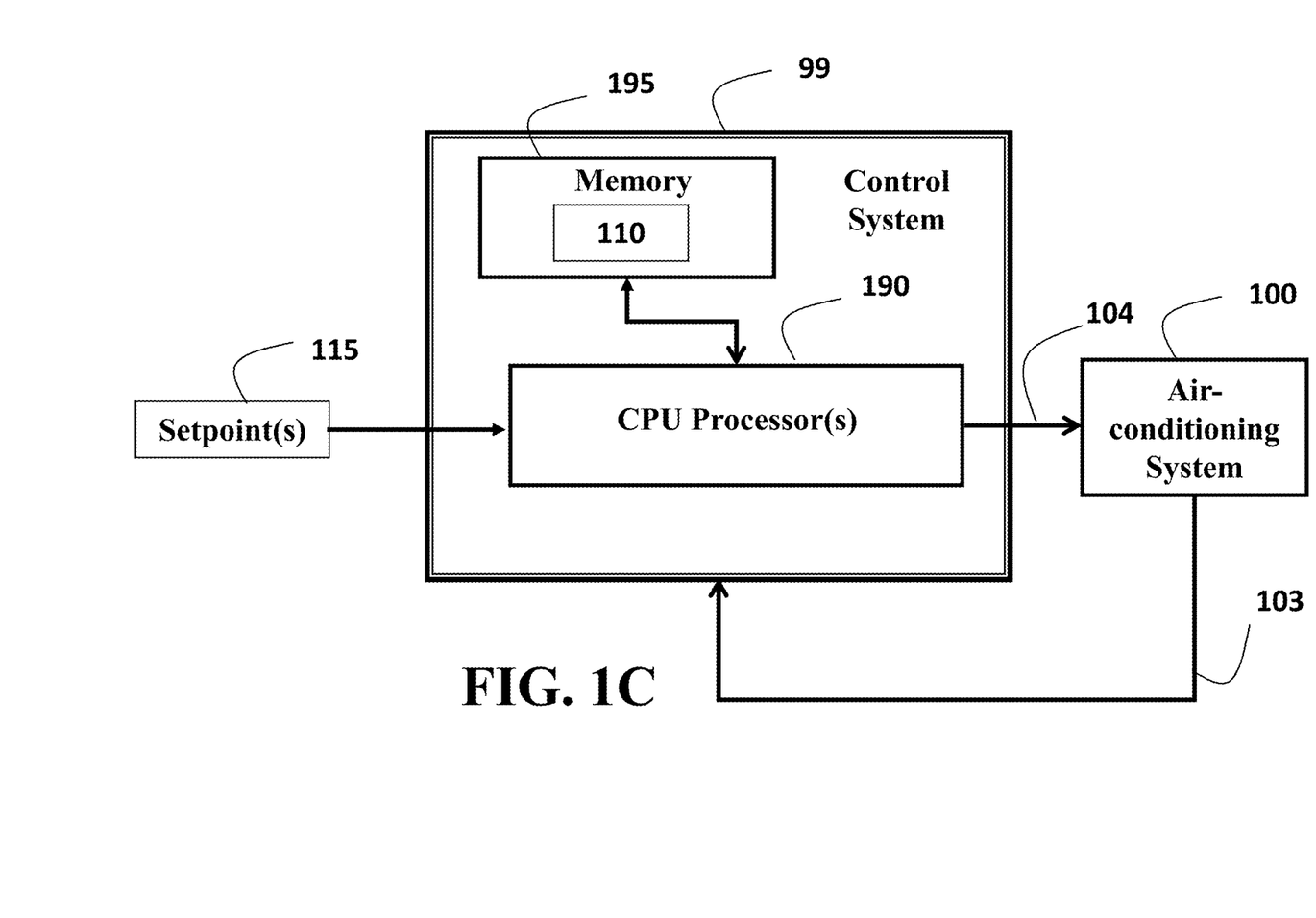
FIG. 1C shows a block diagram of the control system 99 according to some embodiments.

FIG. 1C shows a block diagram of the control system 99 according to some embodiments. The system 99 includes a computer, e.g., in the form of a single central processing unit (CPU) or multiple CPU processors 190 connected to memory 195 for storing the model of the airflow dynamics 110. The control system 99 uses a feedback signal 103 from the operation of the air-conditioning system 100. In some implementations, the feedback signal is represented by the measurements of the sensors 130. The control system 99 determines the control signal 104 for operating the air-conditioning system 100.

Some embodiments are based on recognition that the physical model of the airflow, i.e., the model that captures physics of airflow dynamics, is of infinite dimension and too complex to be used in real time control applications. Accordingly, some embodiments use the model 110 of low, i.e., finite, dimensions suitable for real time update and control. For example, in some embodiments the model includes a reduced order model having a number of parameters less than a physical model of the airflow according to a Boussinesq equation, wherein the Boussinesq equation is a partial differential equation (PDE), and wherein the reduced order model is an ordinary differential equation (ODE).

To that end, some embodiments address a model reduction problem aiming to reduce a complex physical model of, e.g., an infinite dimension, to a simpler model of a lesser dimension, e.g., a finite dimension. In this context, the model reduction problem means determining all parameters or coefficients of the simpler model such that an error between performance measurements of the system according to the complex model and the system according to the simpler model is minimized. For example, in airflow modeling estimation and control applications, there is a need to transform the PDE models representing the airflow with ODE models that have lesser dimension and complexity. Such reduction can allow a real-time control of the airflow systems, such as air conditioning systems.

Figure 2A:
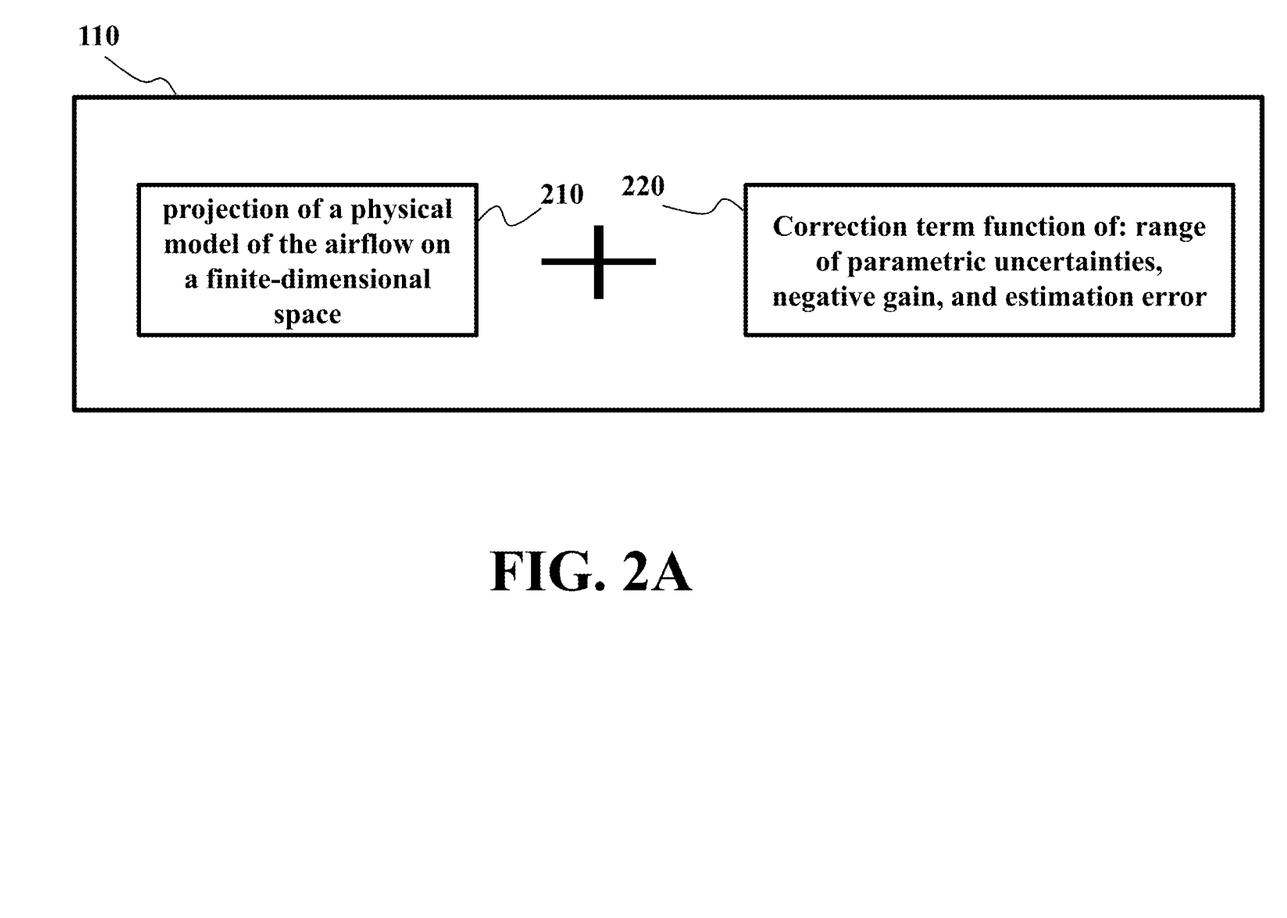
FIG. 2A shows a schematic of a model of the airflow dynamics 110 according to some embodiments.

FIG. 2A shows a schematic of a model of the airflow dynamics 110 according to some embodiments. In those embodiments, the model 110 includes a combination of a first term 210 transitioning a previous state of the airflow to a current state of the airflow and a second term 220 assisting the transitioning. In some embodiments, the first term includes a projection of a physical model of the airflow dynamics on a finite-dimensional space. Because the physical model of the airflow dynamics transitions the previous state of the airflow forward in time to the current state of the airflow, the first term 210 also assists such a transitioning. In addition, because the physical model of the airflow includes physical parameters of the conditioned environment, in various embodiments, the projection preserves the physical parameters of the conditioned environment in the first term.

Figure 2B:
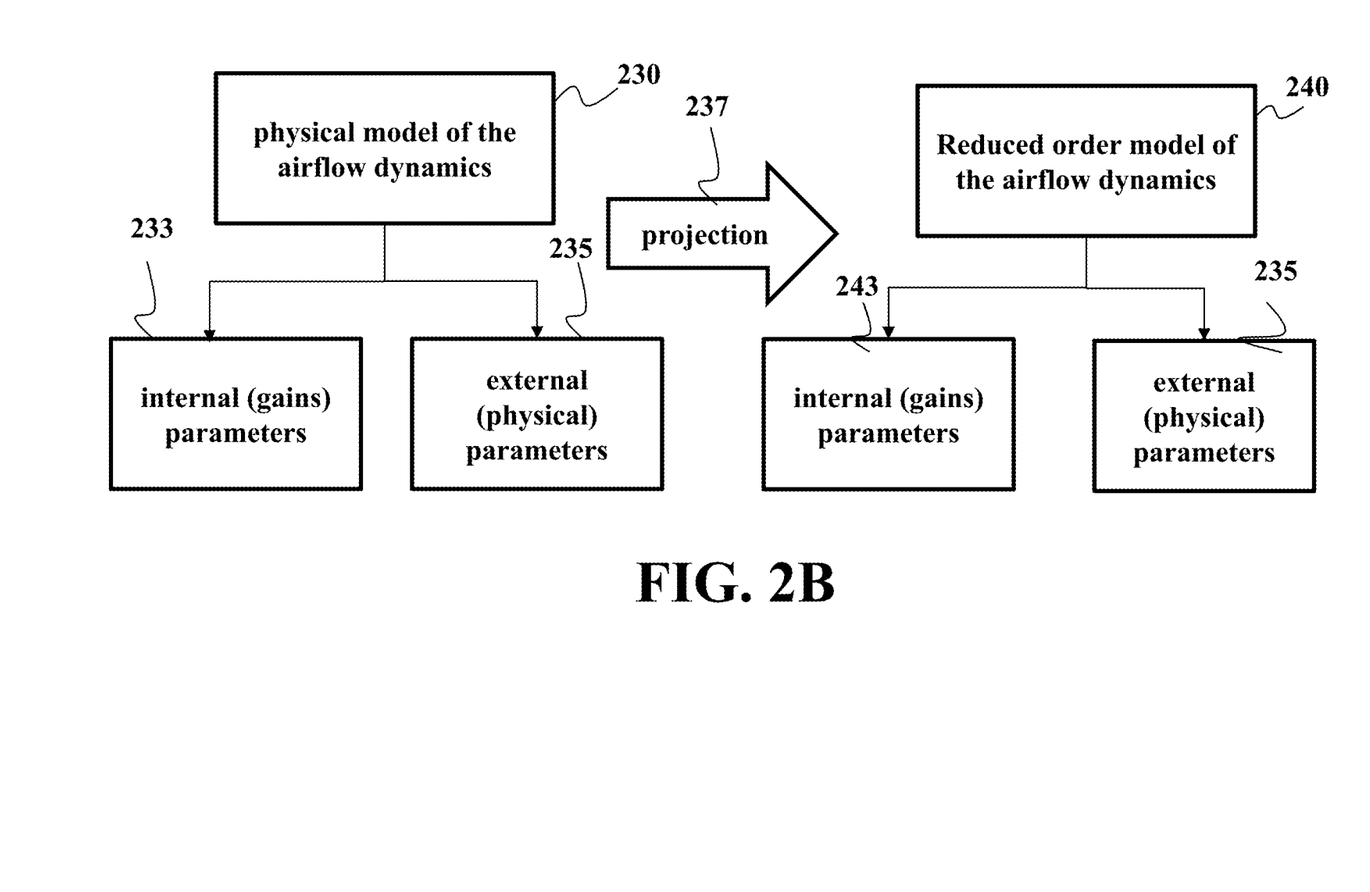
FIG. 2B shows a schematic of projecting the physical model of the airflow dynamics on a finite-dimensional space according to some embodiments.

FIG. 2B shows a schematic of projecting the physical model of the airflow dynamics on a finite-dimensional space according to some embodiments. Some embodiments are based on a realization that physical model of the airflow dynamic 230 has two types of parameters, i.e., internal parameters 233 and external parameters 235. The internal parameters 233 refer to internal gains of the model that have no meaning outside of the model. The external parameters 235 are physical parameters of the world affecting the airflow and exist independently from the model of the airflow dynamics. Examples of such physical parameters include one or combination of a viscosity of the air in the conditioned environment, geometry of the conditioned environment, number and types of objects in the conditioned environment, e.g., heat sources such as people.

Some embodiments are based on recognition that reduction of the model complexities, e.g., projection 237 of the physical model 230 into finite space producing a reduced order model of the airflow dynamics 240, should preserve the external parameters 235, while the internal parameters 243 can differ from internal parameters 233. In such a manner, the reduced complexity model 240 can more accurately represent the physical model 230.

However, the physical parameters of the physical model are often ambiguous, i.e., include uncertainties. For example, the viscosity of the air can vary and/or different number of people can be present in the conditioned environment at different times. Some embodiments are based on recognition that the values of the physical parameters are uncertain with a bounded uncertainty, referred herein as a range of the bounded uncertainty. However, within the range of the bounded uncertainty, the values of the physical parameters are unknown and can vary.

To that end, the first term 210 of the model of the airflow dynamics 110 includes a reduced order model 240 having a value of at least one physical parameter 235 that is uncertain with a bounded uncertainty defining a range of the bounded uncertainty. For example, in some implementations, the physical parameter 235 is a viscosity of the air in the conditioned environment. The statistical analysis of the viscosity of air in the conditioned or similar environment can provide the range of the bounded uncertainty with the desired statistical confidence. However, within the range, the value of the viscosity can vary.

Some embodiments are based on realization that the lack of knowledge about the physical parameters of the model of airflow dynamics can be compensated by forcing an energy function of an observation error in the conditioned environment to decrease for any value of the physical parameters within a range of the bounded uncertainty. To that end, some embodiments use a Lyapunov based method to analyze the energy function and its derivative with respect to time. Some embodiments are based on realization that such an approach allows to absorb the effect of the uncertainties of the physical parameters on estimation of the state of the airflow.

During the analysis of the derivative of the Lyapunov function some embodiments found a term that make the derivative of the Lyapunov function always negative, regardless of the actual value of the uncertainties. This term includes a product of a range of the bounded uncertainty, a negative gain, and an observation error between the measurements of the airflow in the set of points and estimations of the airflow in the set of points according to the model of the airflow to make the derivative of the Lyapunov function always negative, regardless of the actual value of the uncertainties, which in turn, makes the energy function decreases over time iterations, regardless of the value of the uncertainties, and thus the observation error decreases to zero over the time iterations, for any value of the physical parameters within the range of the bounded uncertainty.

To that end, the second term 220 of the model 110 includes a function of the range of the bounded uncertainty, a negative gain, and an observation error between the measurements of the airflow in the set of points and estimations of the airflow in the set of points according to the model of the airflow. In such a manner, the combination of the first and the second terms in the model of the airflow dynamics allow to reduce the complexity of the model while preserving its accuracy.

In various embodiments, the state of the airflow is determined iteratively. Because the second term is designed to force the derivative of the energy function of the observation error to be negative definite, the iterative update of the state of the airflow forces reduction of the observation error over multiple control steps.

In some embodiments, the physical model of the airflow dynamics 230 can be described by a partial differential equation (PDE) transitioning the state of the airflow forward in time. In contrast, the reduced order model of the airflow dynamics 240 and specifically its first term 210 is an ordinary differential equation (ODE) transitioning the state of the airflow forward in time.

Figure 3:
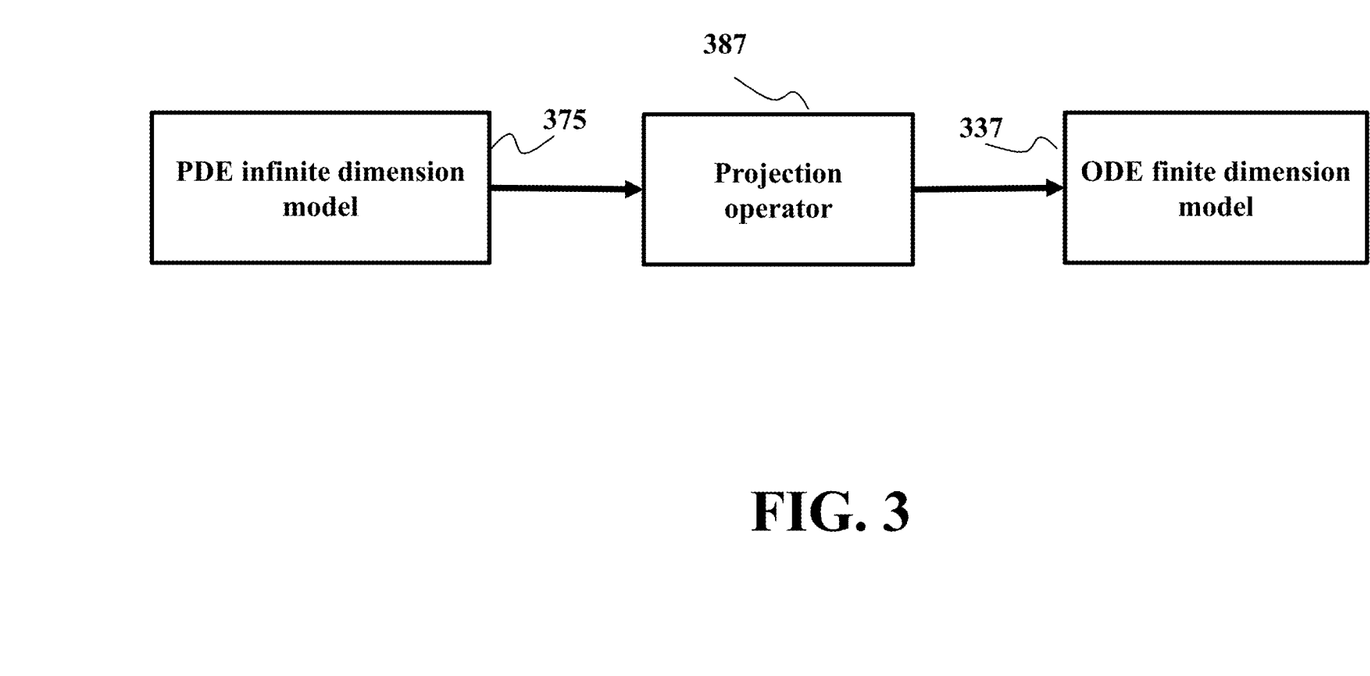
FIG. 3 shows a schematic illustrating the relationship between the PDE model 375 and the ODE model 337 according to some embodiments.

FIG. 3 shows a schematic illustrating the relationship between the PDE model 375 and the ODE model 337 according to some embodiments. In some embodiments, the PDE model 375 is of infinite dimensions, while the ODE model 337 is of finite dimensions. Some embodiments project the PDE model on a low, i.e., finite, dimensional space using a projection operator 337 to arrive on the ODE model 337. In such a manner, the ODE model of the airflow dynamic allows to use the airflow dynamics for real-time control of the air-conditioning system.

In some implementations, the PDE model 375 is defined by the Boussinesq equation. The Boussinesq equations are given by:

$$\vec{u}_t = \mu \Delta \vec{u} - (\vec{u} \cdot \nabla)\vec{u} - \nabla p - T$$

$$\nabla \cdot \vec{u} = 0$$

$$T_t = k \Delta T - u \cdot \nabla T.$$

In this equation, T is a temperature scalar variable and $\vec{u}$ is a velocity vector in three dimensions. Here, $\mu$ is a viscosity and the reciprocal of the Reynolds number, k is the heat diffusion coefficient, and p represents the pressure scalar variable. The operator $\Delta$ and $\nabla$ are defined as:

$$\Delta = \nabla^2$$

$$\nabla = \left(\frac{\delta}{\delta x}, \frac{\delta}{\delta y}, \frac{\delta}{\delta z}\right)^T.$$

The Boussinesq equation describes the coupling between the airflow and the temperature in the room but is of infinite dimensions. In addition, the Boussinesq equation has uncertain conditions where the boundary conditions of the PDE are changing over time or the case where one of the coefficients involved in the PDE are changing. These mathematical changes reflect some real changes in the room. For example, an opening and closing of a window or a door in the room changes the boundary conditions of the Boussinesq PDE. Similarly, weather changes, such as daily and seasonal changes, affect the difference between the temperature in the room and outside of the room, which in turn affect some of the PDE coefficients, e.g. Reynold's number can be affected.

Figure 4:
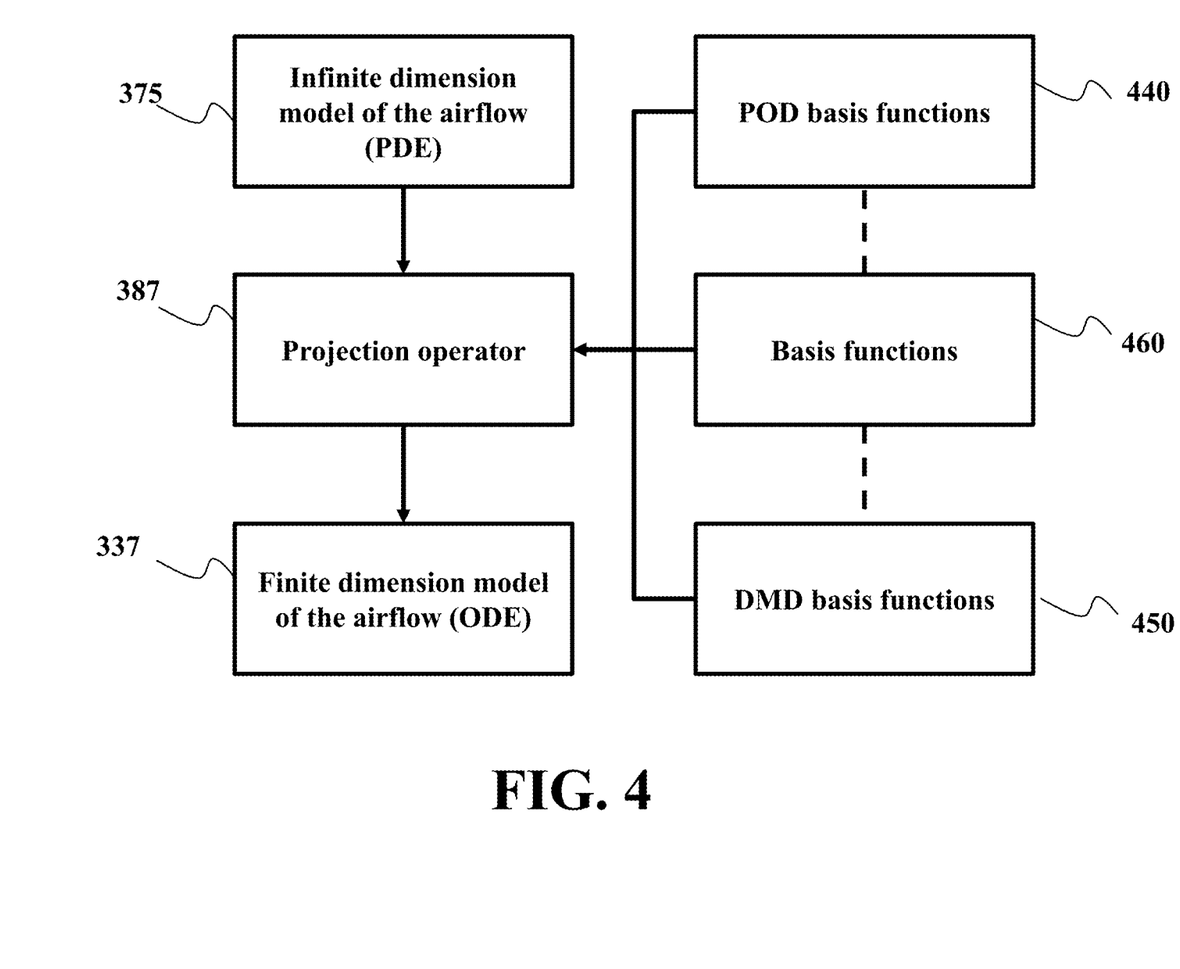
FIG. 4 shows a schematic of selecting the projection operator 387 for projecting an infinite dimension model 375 into a simplified finite dimension model 337 according to some embodiments.

FIG. 4 shows a schematic of selecting the projection operator 387 for projecting an infinite dimension model 375 into a simplified finite dimension model 337 according to some embodiments. In various embodiments, the projection operator needs to preserve the physical parameters of the PDE model. To that end, some embodiments select the projection operator 387 based basis functions 460 for the finite dimension model, sometimes referred to as reduced order model (ROM) 337. The basic functions are obtained from snapshots of the exact solution of the PDE, obtained by extensive numerical solutions referred to as direct numerical simulation (DNS).

Different embodiments use different kinds of basis function 460 to determine the projection operator 387. For example, one embodiment uses a proper orthogonal decomposition (POD) basis function 440. Another embodiment uses a dynamic mode decomposition (DMD) basis function 450. An example of the mathematical formulation of the projection operator is provided below.

After the projection operator 387 is determined, some embodiments use the operator 387 to transform the PDE model of infinite dimensions 375 into ODE model of finite dimensions 337 while preserving the physical parameters of the PDE model.

Figure 5:
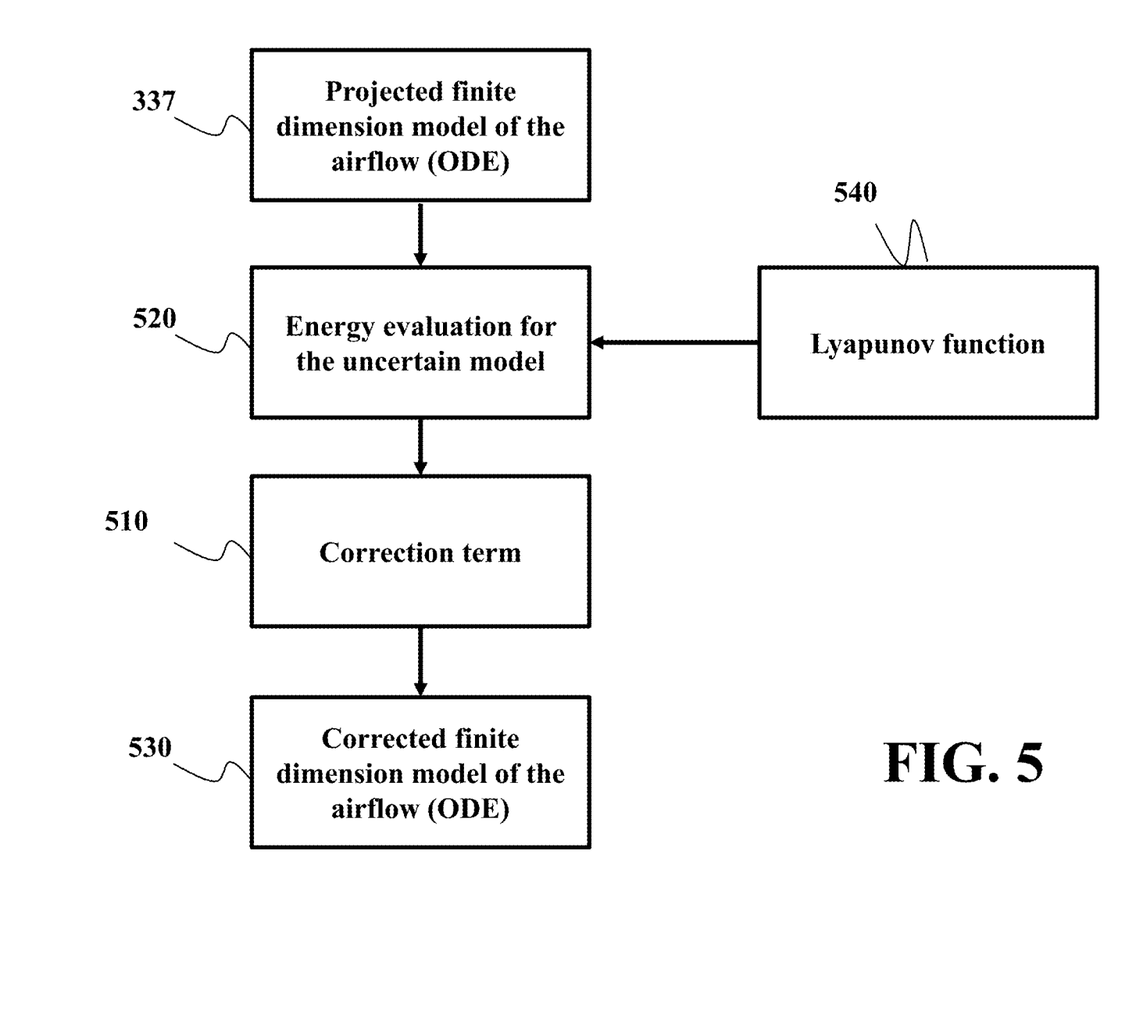
FIG. 5 shows a block diagram of an energy-based method used by some embodiments to compensate the uncertainty of the physical parameters of the model of airflow dynamics.

FIG. 5 shows a block diagram of an energy-based method used by some embodiments to compensate the uncertainty of the physical parameters of the model of airflow dynamics. For example, one embodiment uses a Lyapunov function 540, to evaluate 520 a given energy value of the ODE model 337 determined by the projection 387. The evaluation 520 is used to derive a correction term 510 that together with the model 337 results in a corrected model 530 the resilient to the uncertainties of the physical parameters.

For example, some embodiments to analyze the energy function and its derivative with respect to time. For example, the embodiments design the correction term that forces the derivative of the energy function to be negative definite. Some embodiments are based on realization that such an approach allows to absorb the effect of the uncertainties of the physical parameters on estimation of the state of the airflow.

In some implementations, the energy function is a Lyapunov function of an integral of a square of the observation error. In such a manner, the analysis of the derivative of the Lyapunov function demonstrates that the correction term 510 can make the derivative of the Lyapunov function always negative, regardless of the actual value of the uncertainties.

To that end, in various embodiments, this correction term includes a product of a range of the bounded uncertainty, a negative gain, and an observation error between the measurements of the airflow in the set of points and estimations of the airflow in the set of points according to the model of the airflow. In one embodiment, the state of the airflow is iteratively updated in the conditioned environment for multiple control steps, and the observation error is iteratively reducing.

Figure 6:
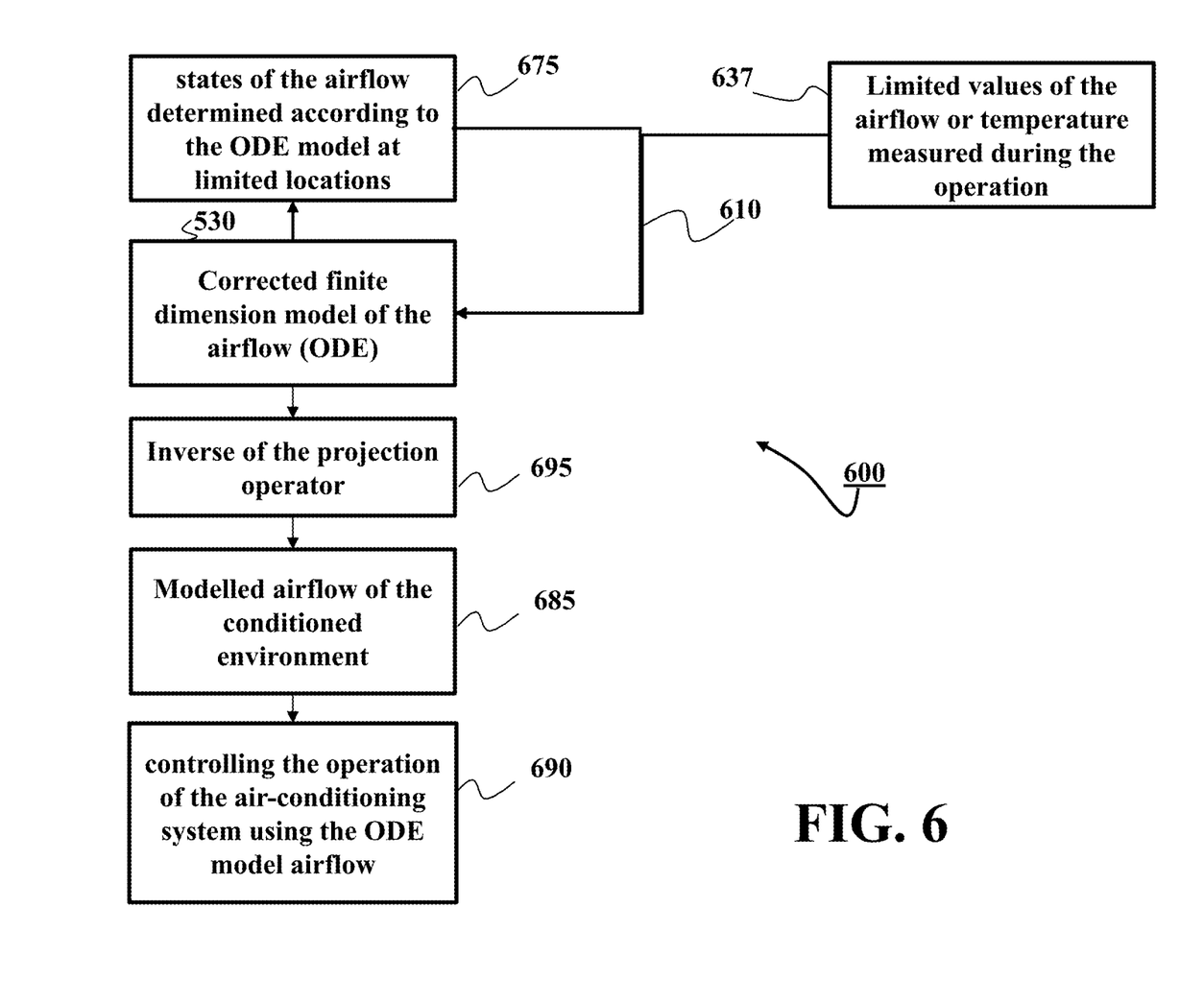
FIG. 6 shows a block diagram of iterative method 600 for controlling the air-conditioning system according to one embodiment.

FIG. 6 shows a block diagram of iterative method 600 for controlling the air-conditioning system according to one embodiment. The embodiment runs the corrected ODE model 530 forward in time to estimate the state of the airflow in the set of points/locations in the conditioned environment. This set of points correspond to the measurements 637 of the state of the airflow by the sensors 130, and the differences between the measurements 637 and the estimations 675 is referred herein as an observation error 610.

Specifically, because the method 600 is performed iteratively, the method determines the current state of the airflow 675 in the conditioned environment by transitioning the previous state of the airflow, i.e., the state 675 determined for a previous control step, forward in time according to the model of airflow dynamics 530. The previous state is transitioned such as to reduce the observation error 610 in the current state of the airflow.

One embodiment estimates the current state of the airflow 675 for the entire conditioned environment, i.e., in all locations of the room 685, while minimizing the observation error only for the set of points corresponding to the measurements 637. One implementation uses data fitting technique to simplify the computation. Additionally, or alternatively, one embodiment uses an inverse projection operator 595 to estimate the full values of the airflow in all locations of the room 585. The projection which was used initially to project the PDE solutions to a lower dimensional space, is now inverted to recover the PDE solutions, i.e., airflow in the high dimensional space, covering the whole room, from the low dimensional space.

After the state of the airflow for the entire conditioned environment 685 is determined, the state of the airflow is used to control 690 the operation of the air-conditioning system to achieve some desired temperature and comfort level in the conditioned environment. For example, the state of the airflow can be compared to a desired set-point of airflow states, obtained for a desired comfort setting, and then the error between the desired airflow set-point and the state of the airflow can be sent to the air-conditioning unit to regulate the temperature or the ventilation in the room.

Some embodiments are based on realization that some gains of the corrected model of the airflow can also be updated to improve the accuracy of the state estimation. For example, due to the correction term 510, the ODE model of the airflow dynamics 530 can have a negative gain to compensate for the uncertainties of the physical parameters. However, the optimal value of the negative gain can be challenging to determine explicitly off-line.

For example, some embodiments are configured to iteratively update at least one gain of the model of airflow dynamics to reduce the observation error. The embodiments can use a data-driven optimization for determining the gains. Examples of the data-driven optimization include one or combination of an extremum-seeking optimization, a Gaussian process upper-confidence bound optimization, and a simulated annealing optimization.

Figure 7:
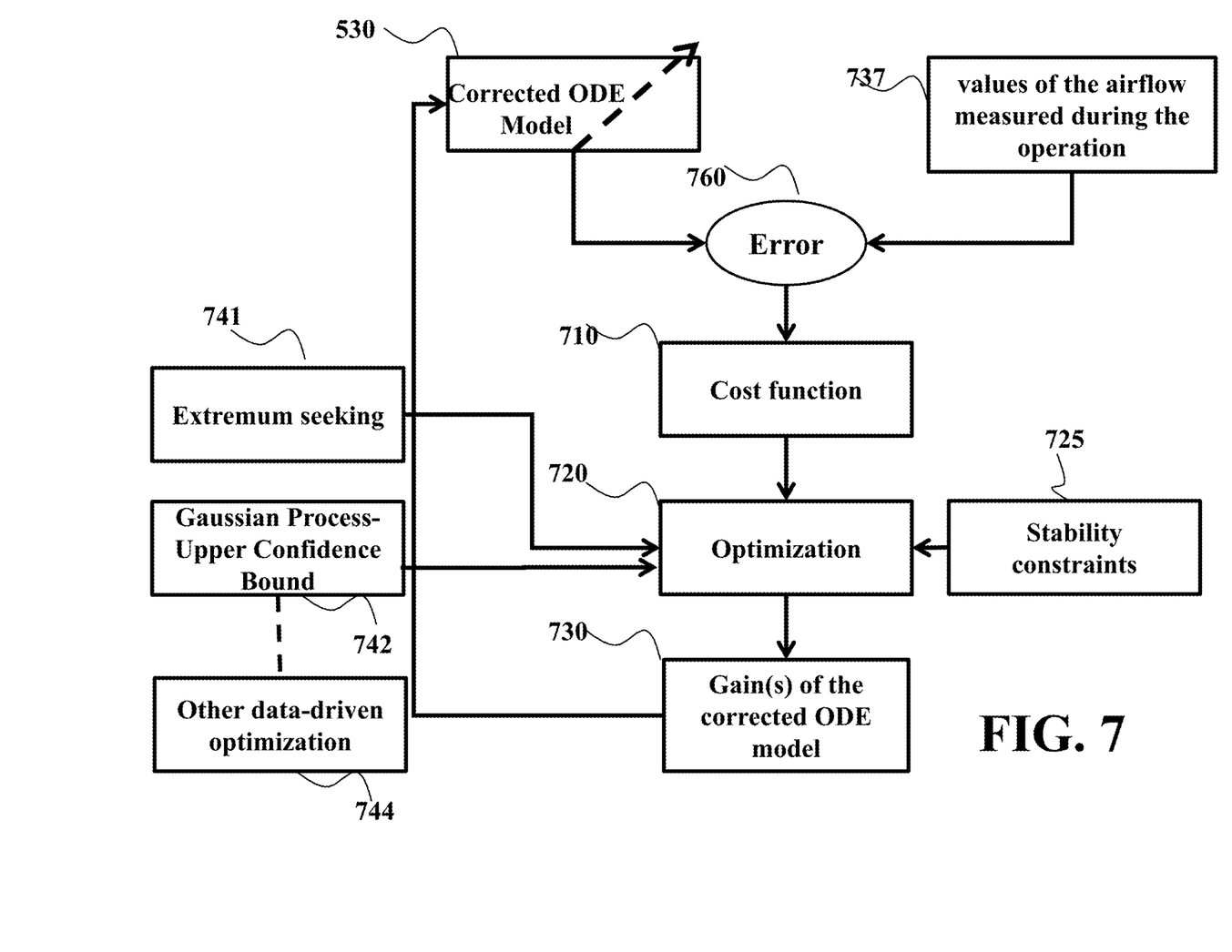
FIG. 7 shows a block diagram of a method for auto-tuning at least one gain of a model of airflow dynamics according to some embodiments.

FIG. 7 shows a block diagram of a method for auto-tuning a gain of a model of airflow dynamics according to some embodiments. The method of FIG. 7 uses the value of the airflow estimated by the ODE model 530, and then compares the estimation with the measurement of the airflow 737. The observation error 760 between these values is then used to evaluate a performance cost function 710. The cost function 610 is used in an optimization 720 that searches for the best possible values of the gain of the correction term 510, while satisfying the stability constraints 725. The updated value of the gain 730 is then used to update the ODE model 530.

The optimization 720 can be any data-driven optimization 744. For instance, one embodiment uses extremum-seeking optimization 741. Another embodiment uses Gaussian processes-upper confidence bound (GP-UCB) optimization 742.

Example of First Term of the Airflow Model

Some embodiments consider the state estimation problem for nonlinear PDE 373 systems of the form $$\dot{z}(t)=Az(t)+Bu(t)+h(z(t),u(t)), z(0)=z_0,$$

$$y(t)=Cz(t), \quad (1)$$

where $z_0 \in D(A) \subset H$, A is a linear operator that generates a $C_0$-semigroup on the Hilbert space H, $B:R^m \to H$ is an input operator, $C:D(A) \to R^p$ is the measurement operator, and h contains higher-order terms that satisfy:

The function $h:D(A) \times R^m \to [D(A)]$ satisfies $h(0,0)=0$ and the local Lipschitz assumption: for each pair (z,u), there exist positive constants $\varepsilon_z, \varepsilon_u, L_z,$ and $L_u$ such that $$Ph(z,u)-h(\tilde{z},\tilde{u})P_H \le L_z Pz-\tilde{z}P_H+L_u Pu-\tilde{u}P_{R^m}$$

for all $(\tilde{z},\tilde{u})$ satisfying $$Pz-\tilde{z}P_H<\varepsilon_z \text{ and } Pu-\tilde{u}P_{R^m}<\varepsilon_u.$$

For a low-dimensional subspace $\hat{H} \subset H$, some embodiments consider an ODE model 337 of the estimator with the following structure $$\dot{\hat{z}}=A_c\hat{z}(t)+B_cu(t)+Fy(t)+G(\hat{z}(t),u(t)), \quad (2)$$

with $\hat{z}(0)=\hat{z}_0 \in D(A_c)$, and where $A_c:\hat{H}=\hat{H}$, $B_c:R^m \to \hat{H}$, $F:R^p \to \hat{H}$, and $G:\hat{H} \times R^m \to \hat{H}$ are to be determined. Possible choices for $\hat{H}$ may be the space spanned by a set of dominant eigen-functions of A (modal approximation) or a set of basic functions obtained by performing a proper orthogonal decomposition (POD) of a collection of simulations of (1) and truncating (POD approximation).

Let $T:H \to \hat{H}$ be the orthogonal projector 387 from H to $\hat{H}$. Then we define the error in the state estimate as $$e(t)=\hat{z}(t)-Tz(t) \in \hat{H}. \quad (3)$$

When $\hat{H}$ is the span of r dominant POD basis functions 440 and $T_{POD}$ 387 is the corresponding projection for a specific trajectory z, then $T_{POD}$ minimizes the projection error $$P(T,z)=(\int_0^{t_f} P\hat{z}(t)-Tz(t)P_H^2 dt)^{1/2},$$

over all projections T into subspaces of H of dimension r. Thus, the specific choice of $T_{POD}$ is a natural one 440, but other basis functions 460 can be used to design the projection. For example, the DMD basis functions could be used 450.

Different implementations select different values of $B_c$ and G in the estimator (2). One embodiment, to guarantee convergence, makes the following relationship $$B_c=TB \quad (4)$$

and $$G(\hat{z},u)=Th(\hat{z},u) \quad (5)$$

for all $z \in \hat{H}$ and $u \in R^m$.

Example of Second Term of the Airflow Model

To derive the second term 237, some embodiments use control theory to robustify the nominal estimator designed in the previous section, by adding a correction term 220, to the ODE model 337.

Let say the PDE system (1) 375 admits an uncertainty on h, as follows $$\dot{z}(t)=Az(t)+Bu(t)+h(z(t),u(t))+\Delta h(z(t)),$$

$$z(0)=z_0,$$

$$y(t)=Cz(t), \quad (6)$$

s.t., $\Delta h:H \to H$, satisfies the following assumption.

Whereas the uncertainty satisfies:

$$\Delta h:H \to H, \text{ is s.t., } P\Delta h(z)P_H \le \Delta h_{max}, \forall z \in H.$$

According the dynamics of the estimator (2), the estimator convergence relies on the design of the vector filed G. To robustify the nominal design, presented above, some embodiments use a Lyapunov redesign approach, and add an extra term to $\Delta G$ 220 to compensate for the uncertain term $\Delta h$.

The robust ODE estimator 530 writes as $$\dot{\hat{z}}(t)=A_c\hat{z}(t)+B_cu(t)+Fy(t)+G(\hat{z},u)+\Delta G(\hat{z}),$$

$$\hat{z}(0)=0, \quad (7)$$

where $\Delta G:\hat{H} \to \hat{H}$ 220, is designed to compensate for the effect of $\Delta h$ on the exponential stability of e.

In this case, the associated error dynamic writes as $$\dot{e}(t)=A_ce(t)+G(e(t)+Tz(t),u(t))-Th(z(t),u(t))+\Delta G(\hat{z})-T\Delta h(z). \quad (8)$$

where $\Delta G$ 220 is given by:

$$\Delta G(\hat{z})=k\Delta h_{max}\tilde{C}^*\tilde{C}e, \quad (9)$$

for $k<0$, and any $\tilde{C}$ satisfying $$\tilde{C}T=C. \quad (10)$$

Example of Learning-based Tuning of the Airflow Model

The passive robustification 220 presented above guarantees an asymptotic performance. However, some embodiments are also interested in improving the transient performance of the estimator. For this reason, some embodiments improve the previous passive robust estimator, by complementing it with an active learning shown in relation with FIG. 7, which learns the internal parameters, e.g., an estimator feedback gain k 730.

To that end, some embodiments merge together the passive robust ODE model 530, with an active learning, to improve the performance of the model 530. Indeed, one parameter which could benefit from online tuning is the robust ode model gain k 730.

To find this optimal value of the robust ode model gain 730, some embodiments use a data-driven optimization 720 to auto-tune the gain online, while the robust ode model is estimating the system states. The feedback gain as $$k=k_{nominal}+\delta k, k_{nominal}<0, \quad (11)$$

where $k_{nominal}$ represents the nominal value of the estimator gain, and $\delta k$ is the necessary adjustment of the gain to improve the transient performance of the estimator.

The learning cost function 710 is $$Q(\delta k) = \int_0^T \|e_y\|_H^2 dt,$$

$$e_y(\delta k) = \hat{y}(t; \delta k) - y(t),$$

$$\hat{y} = C\hat{z}, \quad (12)$$

where $T>0$, $\hat{z}$ is solution of the estimator (7), (9), and y is the measured output. Furthermore, for analysis purposes, we will need the following assumptions on Q: The cost function $Q(\delta k)$ in (12) has a local minimum at $\delta k = \delta k^*$.

One embodiment uses the following time-varying amplitude-based extremum seeking algorithm 741, to tune $\delta k$ $$\dot{x}_k = -\delta_k \omega_k \sin(\omega_k t) Q(\delta k),$$

$$\delta k(t) = x_k(t) + a_k \sin(\omega_k t),$$

$$\dot{a}_k = -\delta_k \omega_k \varepsilon_k a_k, \quad (13)$$

where $\delta_k > 0$, $\omega_k > 0$, $\varepsilon_k > 0$ are tuning gains.

Another embodiment uses a Gaussian Process-Upper Confidence Bound algorithm 742 to optimize the robust ode model gain 730. Yet other embodiments use other data-driven optimization algorithms 744, e.g., reinforcement learning algorithms, neural network, deep neural network, etc.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for controlling an operation of an air-conditioning system generating airflow in a conditioned environment, comprising:
    a set of sensors configured to produce measurements of the airflow in a set of points in the conditioned environment;
    a memory configured to store a model of the airflow dynamics including a combination of a first term transitioning a previous state of the airflow to a current state of the airflow and a second term assisting the transitioning, wherein the first term includes a projection of a physical model of the airflow on a finite-dimensional space, wherein the physical model of the airflow includes physical parameters of the conditioned environment and the projection preserves the physical parameters of the conditioned environment in the first term, wherein a value of at least one physical parameter is uncertain with a bounded uncertainty defining a range of the bounded uncertainty, and wherein the second term includes a function of the range of the bounded uncertainty, a negative gain, and an observation error between the measurements of the airflow in the set of points and estimations of the airflow in the set of points according to the model of the airflow; and
    a processor configured to execute an estimator to estimate the current state of the airflow in the conditioned environment by transitioning the previous state of the airflow forward in time according to the model of airflow dynamics to reduce the observation error in the current state of the airflow; and configured to execute a controller to control the air-conditioning system based on the current state of the airflow.

2. The system of claim 1, wherein the observer iteratively updates states of the airflow in the conditioned environment for multiple control steps.

3. The system of claim 1, wherein the estimator and the controller are implemented using a processor.

4. The system of claim 1, wherein the second term relates the range of bounded uncertainty of the physical parameter with a derivative of an energy function of the observation error in the conditioned environment.

5. The system of claim 4, wherein the second term forces the derivative of the energy function to be negative definite.

6. The system of claim 5, wherein the energy function is a Lyapunov function of an integral of a square of the observation error.

7. The system of claim 1, wherein the first term of the model of the airflow dynamics includes an ordinary differential equation (ODE) having the physical parameters of a partial differential equation (PDE) of time-space continuous values of the airflow in the conditioned environment, such that the second term modifies the ODE in the model of the airflow.

8. The system of claim 7, wherein the physical parameters include one or combination of a viscosity of the air in the conditioned environment, a geometry of the conditioned environment, number and types of objects in the conditioned environment.

9. The system of claim 7, wherein the PDE is defined by a Boussinesq equation, wherein dimensions of the ODE is less than dimensions of the PDE according to the Boussinesq equation.

10. The system of claim 7, wherein a projection operator connecting the PDE and the ODE is a function of a basis function for the ODE.

11. The system of claim 10, wherein the basic function includes one or combination of a roper orthogonal decomposition (POD) basis function and a dynamic mode decomposition (DMD) basis function.

12. The system of claim 1, further comprising:
    a processor configured to iteratively update gains of the model of airflow dynamics to reduce the observation error.

13. The system of claim 12, wherein the processor uses a data-driven optimization for determining the gains.

14. The system of claim 13, wherein the data-driven optimization is one or combination of an extremum-seeking optimization, a Gaussian process upper-confidence bound optimization, and a simulated annealing optimization.

15. The system of claim 1, wherein the controller determines control inputs to at least one component of the air-conditioning system comprising:
   an evaporator having a fan for adjusting an air-flow rate through a heat exchanger;
   a condenser having a fan for adjusting the air-flow rate through the heat exchanger;
   a compressor having a speed for compressing and pumping refrigerant through the system; and
   an expansion valve for providing an adjustable pressure drop between a high-pressure portion and a low-pressure portion of the vapor compression system.

16. A method for controlling an operation of an air-conditioning system generating airflow in a conditioned environment, wherein the method uses a processor coupled with stored instructions implementing the method, wherein the instructions, when executed by the processor carry out steps of the method, comprising:
   measuring the airflow at a set of points in the conditioned environment;
   retrieving a model of the airflow dynamics including a combination of a first term transitioning a previous state of the airflow to a current state of the airflow and a second term assisting the transitioning, wherein the first term includes a projection of a physical model of the airflow on a finite-dimensional space, wherein the physical model of the airflow includes physical parameters of the conditioned environment and the projection preserves the physical parameters of the conditioned environment in the first term, wherein a value of at least one physical parameter is uncertain with a bounded uncertainty defining a range of the bounded uncertainty, and wherein the second term includes a function of the range of the bounded uncertainty, a negative gain, and an observation error between the measurements of the airflow in the set of points and estimations of the airflow in the set of points according to the model of the airflow;
   estimating the current state of the airflow in the conditioned environment by transitioning the previous state of the airflow forward in time according to the model of airflow dynamics to reduce the observation error in the current state of the airflow; and
   controlling the air-conditioning system based on the current state of the airflow.

17. The method of claim 16, wherein the second term relates the range of bounded uncertainty of the physical parameter with a derivative of an energy function of the observation error in the conditioned environment, wherein the second term forces the derivative of the energy function to be negative definite, and wherein the energy function is a Lyapunov function of an integral of a square of the observation error.

18. The method of claim 16, wherein the first term of the model of the airflow dynamics includes an ordinary differential equation (ODE) having the physical parameters of a partial differential equation (PDE) of time-space continuous values of the airflow in the conditioned environment, such that the second term modifies the ODE in the model of the airflow, wherein the PDE is defined by a Boussinesq equation, wherein dimensions of the ODE is less than dimensions of the PDE according to the Boussinesq equation.

19. The method of claim 16, wherein the physical parameters include one or combination of a viscosity of the air in the conditioned environment, a geometry of the conditioned environment, number and types of objects in the conditioned environment.

20. A non-transitory computer readable storage medium embodied thereon a program executable by a processor for performing a method, the method comprising:
   measuring the airflow at a set of points in the conditioned environment;
   retrieving a model of the airflow dynamics including a combination of a first term transitioning a previous state of the airflow to a current state of the airflow and a second term assisting the transitioning, wherein the first term includes a projection of a physical model of the airflow on a finite-dimensional space, wherein the physical model of the airflow includes physical parameters of the conditioned environment and the projection preserves the physical parameters of the conditioned environment in the first term, wherein a value of at least one physical parameter is uncertain with a bounded uncertainty defining a range of the bounded uncertainty, and wherein the second term includes a function of the range of the bounded uncertainty, a negative gain, and an observation error between the measurements of the airflow in the set of points and estimations of the airflow in the set of points according to the model of the airflow;
   estimating the current state of the airflow in the conditioned environment by transitioning the previous state of the airflow forward in time according to the model of airflow dynamics to reduce the observation error in the current state of the airflow; and
   controlling the air-conditioning system based on the current state of the airflow.

* * * * *